United States Patent
Eldeeb et al.

(10) Patent No.: US 10,686,394 B1
(45) Date of Patent: Jun. 16, 2020

(54) CONDITION MONITORING AND FAULT DETECTION IN INDUCTION MOTORS

(71) Applicants: Hassan H. Eldeeb, Miami, FL (US); Alberto Berzoy, Tucker, GA (US); Ahmed A. Saad, Miami, FL (US); Osama Mohammed, Miami, FL (US)

(72) Inventors: Hassan H. Eldeeb, Miami, FL (US); Alberto Berzoy, Tucker, GA (US); Ahmed A. Saad, Miami, FL (US); Osama Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/782,621

(22) Filed: Feb. 5, 2020

(51) Int. Cl.
*H02P 21/30* (2016.01)
*H02P 21/13* (2006.01)

(52) U.S. Cl.
CPC ............. *H02P 21/30* (2016.02); *H02P 21/13* (2013.01)

(58) Field of Classification Search
CPC .................................. H02P 21/30; H02P 21/13

USPC ........................................................ 318/801
See application file for complete search history.

(56) References Cited

U.S. PATENT DOCUMENTS

| | | | | |
|---|---|---|---|---|
| 5,739,698 | A * | 4/1998 | Bowers | G01R 23/20 324/545 |
| 9,453,869 | B1 * | 9/2016 | Parkin | G01R 31/50 |
| 2011/0254562 | A1 * | 10/2011 | Hobelsberger | G01R 31/34 324/521 |
| 2013/0272621 | A1 * | 10/2013 | Lasserre | G06T 9/00 382/233 |
| 2017/0102425 | A1 * | 4/2017 | Hao | G01R 31/346 |
| 2019/0303668 | A1 * | 10/2019 | King | G06K 9/00201 |

* cited by examiner

*Primary Examiner* — Kawing Chan
(74) *Attorney, Agent, or Firm* — Saliwanchik, Lloyd & Eisenschenk

(57) ABSTRACT

Methods and systems for real-time, in-service, non-intrusive condition monitoring of turn-to-turn faults (TTFs) of an induction motor stator in a drive system. A time-domain-based signal processing technique, mathematical morphology, can be used for condition monitoring based on the radiated electromagnetic (EM) field from the induction motor. The vector control technique implemented to drive the induction motor can be direct torque control, and the mathematical morphology technique can detect incipient TTFs based on the radiated magnetic field.

20 Claims, 5 Drawing Sheets

CONDITION MONITORING AND FAULT DETECTION IN INDUCTION MOTORS

BACKGROUND

Online detection of turn-to-turn faults (TTFs) in an induction motor stator at their incipient stages is more challenging in vector closed-loop control than in open-loop and directly online (DOL) connected ones. That is a consequence of their inherent compensative nature that masks the signatures available in the faulty DOL induction motors, or motors fed by open-loop drives. Also, the abrupt voltage transitions accompanying high switching frequency ($f_s$) of a voltage source inverter (VSI) accelerates the TTF propagation. A stator's TTF results in local thermal stress over the windings adjacent to the faulty turns, and a rise in the voltage per turn value of the faulty phase.

Despite the fact that the vector controller employed in the majority of high performance motor drive industries is the direct torque control (DTC), few methods exist to attempt to detect and investigate a stator's TTF of DTC-driven induction motors. Such methods include condition monitoring of TTF in DTC-controlled induction motors via motor current signature analysis (MSCA) in frequency domain (F-domain), positive sequence component of a motor's current ($i_s$), and TTF detection based on the spectrum of the developed power in the F-domain. However, relying on the F-domain for condition monitoring in DTC is experimentally impractical. Analyzing the signal in the time domain (T-domain) can possibly decrease computational burdens and enhance the accuracy of condition monitoring, such as that based on the impedance. However, such a technique based on the impedance is unable to detect the fault location, and it is very generic in that it can indicate that there is some fault in the motor but cannot determine the nature of the fault.

BRIEF SUMMARY

Embodiments of the subject invention provide novel and advantageous methods and systems for real-time, in-service, non-intrusive condition monitoring of turn-to-turn faults (TTFs) of an induction motor stator in a drive system (e.g., a drive system of an electric vehicle (EV)). Owing to the high performance requirements, the drive system of an EV is typically vector controlled (i.e., closed-loop controlled). A time-domain (T-domain)-based signal processing technique, mathematical morphology (Mat-Morph), can be used for condition monitoring based on the radiated electromagnetic (EM) field (or the radiated magnetic field) from the induction motor. The vector control technique implemented to drive the induction motor can be direct torque control (DTC), which is the most commonly implemented vector control drive technique in industry due to its robustness and independence of motor parameters. The Mat-Morph technique can detect incipient TTF more accurately than spectrum-based techniques.

In an embodiment, a method for condition monitoring of TTFs of an induction motor in a drive system can comprise: receiving (e.g., by a processor configured to receive signals from the induction motor) a signal of the induction motor, the signal comprising information on a radiated magnetic field of the induction motor; performing (e.g., by the processor) a Mat-Morph technique on the signal of the induction motor, based on the information on the radiated magnetic field of the induction motor, the Mat-Morph technique being performed in the time domain; and determining (e.g., by the processor) whether a TTF exists in the induction motor and, if so, a location of the TTF, based on results of the Mat-Morph technique. The induction motor can be driven by direct torque control DTC, and the drive system can be an EV drive system. The performing of the Mat-Morph technique can comprise extracting relevant features of the signal based on interaction between the signal and a structuring element (SE) of the Mat-Morph technique. The SE can be $2^n$, where n is a positive integer (for example, n can be 4 such that the SE is 16), and a length of the SE can be $2^n$ times $T_s$, where $T_s$ is a sampling time of the signal. The performing of the Mat-Morph technique can comprise performing a dilation operation to produce a dilated signal, an erosion operation to produce an eroded signal, and a Mat-Morph Gradient (MMG) operation, the MMG operation comprising subtracting the erosion signal from the dilation signal. The determining of whether a TTF exists in the induction motor can comprise monitoring an energy end value of the induction motor after performing the Mat-Morph technique.

In another embodiment, a system for condition monitoring of TTFs of an induction motor in a drive system can comprise: a sensor configured to detect magnetic radiation (e.g., a an external magnetic flux sensor such as a loop antenna); a processor; and a (non-transitory) machine-readable medium (e.g., a (non-transitory) computer-readable medium) in operable communication with the processor and the sensor, and comprising instructions stored thereon that when executed cause the processor to: receive a signal of the induction motor, the signal comprising information on a radiated magnetic field of the induction motor; perform, a Mat-Morph technique on the signal of the induction motor, based on the information on the radiated magnetic field of the induction motor, the Mat-Morph technique being performed in the time domain; and determine whether a TTF exists in the induction motor and, if so, a location of the TTF, based on results of the Mat-Morph technique. The sensor can be positioned close to the induction motor, such that it can detect the radiated magnetic field of the induction motor. The induction motor can be driven by direct torque control DTC, and the drive system can be an EV drive system. The performing of the Mat-Morph technique can comprise extracting relevant features of the signal based on interaction between the signal and an SE of the Mat-Morph technique. The SE can be $2^n$, where n is a positive integer (for example, n can be 4 such that the SE is 16), and a length of the SE can be $2^n$ times $T_s$, where $T_s$ is a sampling time of the signal. The performing of the Mat-Morph technique can comprise performing a dilation operation to produce a dilated signal, an erosion operation to produce an eroded signal, and an MMG operation, the MMG operation comprising subtracting the erosion signal from the dilation signal. The determining of whether a TTF exists in the induction motor can comprise monitoring an energy end value of the induction motor after performing the Mat-Morph technique.

BRIEF DESCRIPTION OF DRAWINGS

FIG. 4(a) shows $\vec{H}$ in the time domain (T-domain), in amps per meter (A/m); FIG. 4(b) shows a zoom-in of $\vec{H}$ crossing at the peak; FIG. 4(c) shows a dilated signal (δ) in A/m; FIG. 4(d) shows an eroded signal (ε) in A/m: FIG. 4(e) shows Mat-Morph gradient (MMG), which is the difference between the dilated signal and the eroded signal, in A/m; and FIG. 4(f) shows accumulated energy in amps-seconds per meter (A-s/m). The x-axis in each of FIGS. 4(a)-4(f) is time in milliseconds (ms).

FIG. 5(a) shows the energy's end value (EEV) in A-s/m; and FIG. 5(b) shows the EEV percentage (%) for α=0°.

FIG. 6(a) shows the energy's end value (EEV) in A-s/m; and FIG. 6(b) shows the EEV percentage (%) for d=15 centimeters (cm).

DETAILED DESCRIPTION

Embodiments of the subject invention provide novel and advantageous methods and systems for real-time, in-service, non-intrusive condition monitoring of turn-to-turn faults (TTFs) of an induction motor stator in a drive system (e.g., a drive system of an electric vehicle (EV)). Owing to the high performance requirements, the drive system of an EV is typically vector controlled (i.e., closed-loop controlled). A time-domain (T-domain)-based signal processing technique, mathematical morphology (Mat-Morph), can be used for condition monitoring based on the radiated electromagnetic (EM) field (or the radiated magnetic field) from the induction motor. The vector control technique implemented to drive the induction motor can be direct torque control (DTC), which is the most commonly implemented vector control drive technique in industry due to its robustness and independence of motor parameters. The Mat-Morph technique can detect incipient TTF more accurately than spectrum-based techniques.

The detection of a stator fault based on the frequency domain (F-domain) signatures of the radiated magnetic field ($\vec{H}$) can be used for directly online (DOL) machines. Condition monitoring based on the radiated $\vec{H}$ captured by an external magnetic loop antenna has the merits of being in-service and non-intrusive, and the loop antenna is less likely to saturate compared to current sensors used in the motor current signature analysis (MSCA), developed power, and impedance-based condition monitoring techniques. Among various T-domain signal processing routines, Mat-Morph theory, which can also be used for image processing applications, can detect broken bar faults and TTF failures for DOL-connected induction motors.

Embodiments of the subject invention provide fault diagnosis techniques (e.g., algorithms) based on Mat-Morph algebra and the radiated $\vec{H}$ field from a DTC-driven induction motor to detect TTF failures in real-time. The examples below show testing of the FD techniques using finite element analysis (FEA) co-simulation and experimental environments, as well as comparative analysis between the accuracy of Mat-Morph based condition monitoring and F-domain based condition monitoring. The examples below also show testing of the accuracy of the FD techniques through changing the location of the loop antenna.

Figure 1:
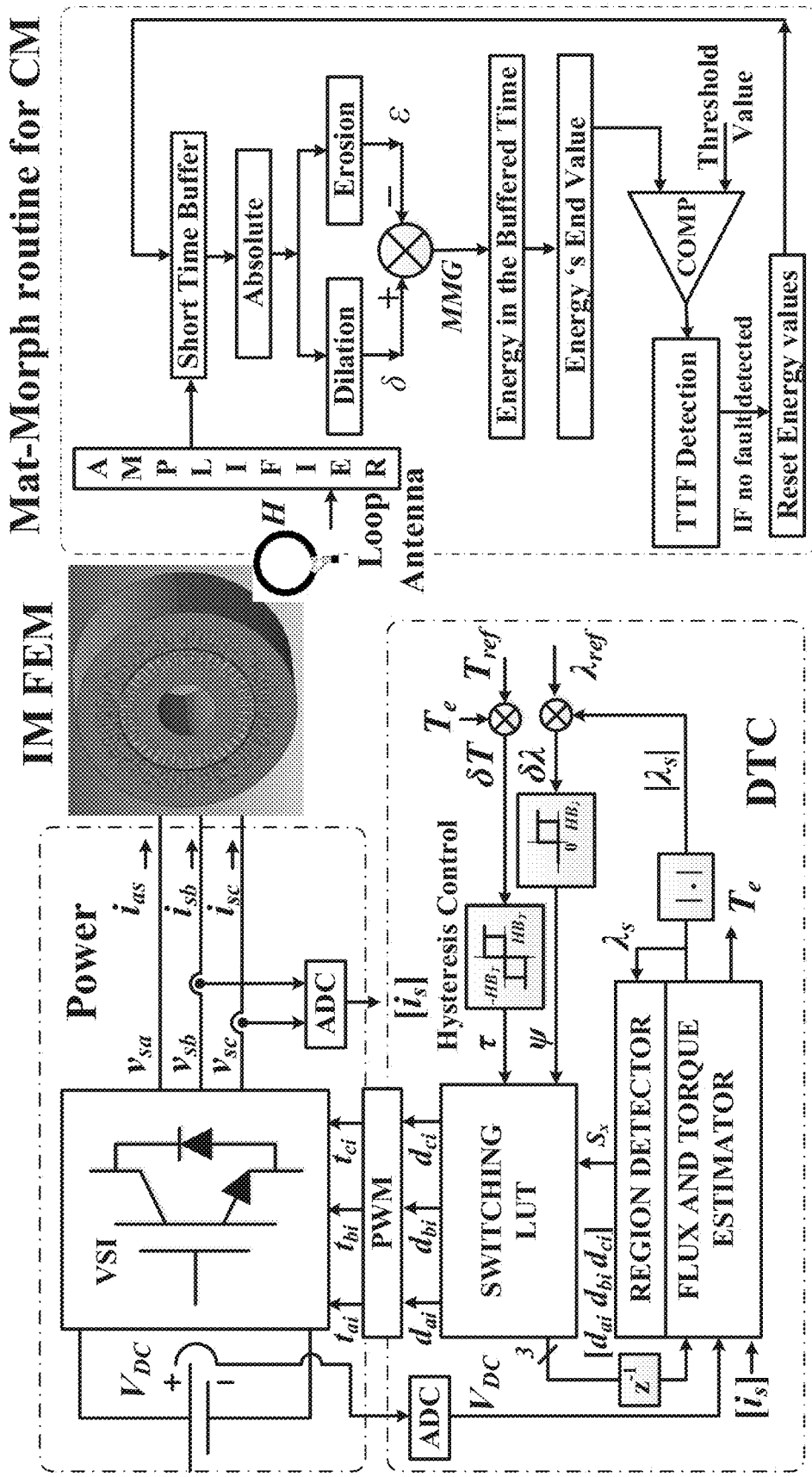
FIG. 1 is a schematic view of the structure of a co-simulation platform of a direct torque control (DTC)-driven asynchronous motor system, according to an embodiment of the subject invention.

FIG. 1 is a schematic view of the structure of a co-simulation platform of a DTC-driven asynchronous motor system, according to an embodiment of the subject invention. The DTC is a descendant of the hysteresis control theory. Its philosophy is to diminish the error between the estimated and reference values of the developed torque ($T_e$), via a two-level hysteresis controller, and the magnitude of the flux-linkage ($|\lambda_s|$), via a three-level hysteresis controller. The DTC controller can be implemented with a fixed switching frequency (e.g., $f_s$=10 kilohertz (kHz)). The developed torque and the magnitude of the flux linkage can be estimated instead of being measured by the DTC controllers. The DTC system can be summarized as follows.

The DTC cycle starts with measuring the voltage of the DC-link ($V_{DC}$), and the current of two of the motors line ($i_{sb}$ and $i_{sc}$). The third line current ($i_{sa}$) is calculated by KCL as in Equation (1), whereas the output phase voltages of the VSI ($\hat{v}_s$) can be computed using the switching sequence ($[d_{ia}\ d_{ib}\ d_{ic}]^T$) as in Equation (2).

$$i_{sa} = (-i_{sb} + i_{sc}) \quad (1)$$

$$[\hat{v}_s] = \begin{bmatrix} \hat{v}_{sa} \\ \hat{v}_{sb} \\ \hat{v}_{sc} \end{bmatrix} = \frac{V_{DC}}{3} \begin{bmatrix} 2 & -1 & -1 \\ -1 & 2 & -1 \\ -1 & -1 & 2 \end{bmatrix} \begin{bmatrix} d_{ia} \\ d_{ib} \\ d_{ic} \end{bmatrix}; d_i = \{0, 1\} \quad (2)$$

Then, $[\hat{v}_s]$ and $[i_s]$ are transformed from abc frame to the αβ frame, and the flux-linkage of the stator ($\hat{\lambda}_s$) is estimated by Equation (3).

$$\hat{\lambda}_s = \int (\hat{v}_s - R_s \hat{i}_s) dt \quad (3)$$

Using $i_{s\alpha\beta}$ and $\hat{\lambda}_{s\alpha\beta}$, $T_e$ is estimated via Equation (4), where $R_s$ is the stator resistance.

$$\hat{T}_e = \frac{3}{2}\frac{P}{2}|\hat{\lambda}_{s\alpha\beta} \times i^*_{s\alpha\beta}| = \frac{3}{2}\frac{P}{2}(i_{s\beta}\hat{\lambda}_{s\alpha} - i_{s\alpha}\hat{\lambda}_{s\beta}) \quad (4)$$

Figure 2A:
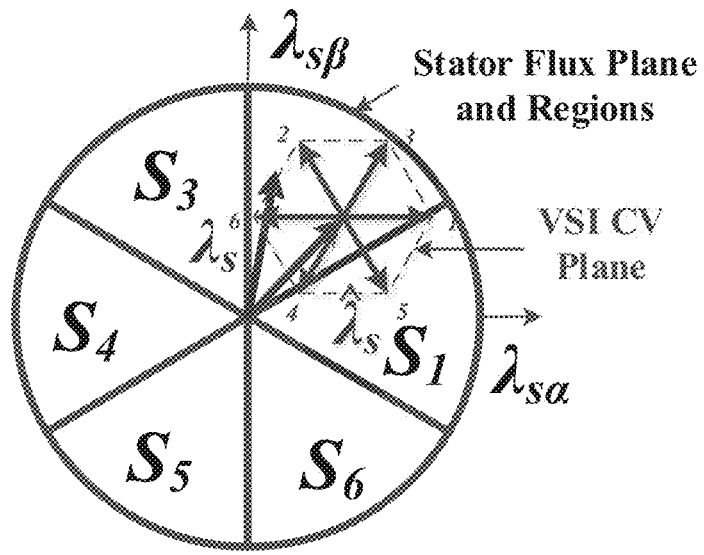
FIG. 2(a) shows estimated and actual stator flux ($\lambda_s(t_k)$).
Figure 2B:
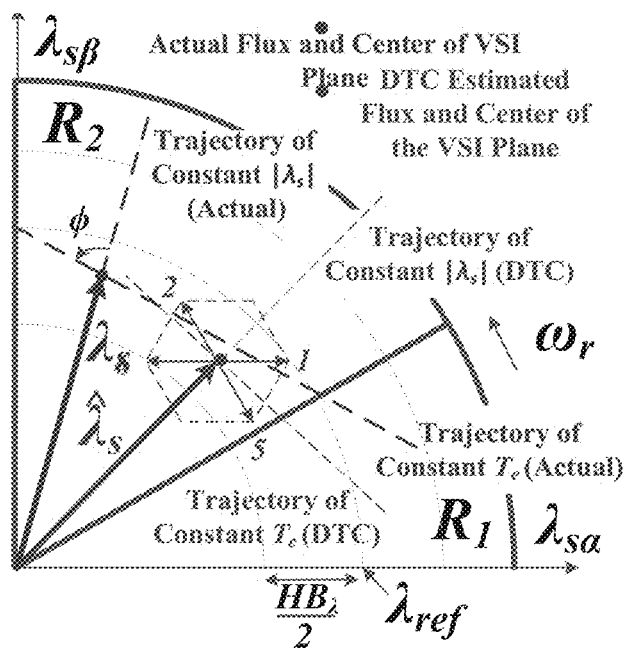
FIG. 2(b) shows a zoomed-in view of the DTC flux tracking.

The error between the estimated and reference values of $T_e$ ($\delta T_e = T_{ref} - T_e$) and $\lambda_s$ ($\delta|\lambda_s| = \lambda_{ref} - |\lambda_s|$) fed into the hysteresis controllers. According to the outputs of the controllers (ψ, τ) and the space vector (SV) sector ($S_x$; ={1-6}) of the previous switching cycle ($t_{k-1}$), the SV sector of the new cycle ($t_k$) is determined, as in FIG. 2. The DTC switching look-up table (LUT), as in Table I, determines the gate signals to the VSI.

TABLE I

| DTC Switching LUT | | | | | |
|---|---|---|---|---|---|
| τ, ψ | ↓↓ | ↑↓ | ↓↑ | ↑↑ | 0 |
| $S_1$ | $v_{S4}$ | $v_{S2}$ | $v_{S5}$ | $v_{S3}$ | 0 |
| $S_2$ | $v_{S5}$ | $v_{S6}$ | $v_{S1}$ | $v_{S2}$ | 0 |
| $S_3$ | $v_{S1}$ | $v_{S4}$ | $v_{S3}$ | $v_{S6}$ | 0 |
| $S_4$ | $v_{S3}$ | $v_{S5}$ | $v_{S2}$ | $v_{S4}$ | 0 |
| $S_5$ | $v_{S2}$ | $v_{S1}$ | $v_{S6}$ | $v_{S5}$ | 0 |
| $S_6$ | $v_{S6}$ | $v_{S3}$ | $v_{S4}$ | $v_{S1}$ | 0 |

From the perspective of the EM fields, the asynchronous machine is composed of thousands of short dipoles. A Hertzian (short) dipole of length (Δl) carrying a time-varying current (i) will generate a magnetic potential vector ($\vec{A}$) at any observational point (OP) located at the spherical coordinates (r, θ, Φ) as in Equation (5):

$$\vec{A} = \frac{\mu i (\Delta l)}{4\pi r}(e^{-j\xi r})a_z \tag{5}$$

where ξ is the phase constant and μ is the permeability. By solving Equation (6), the magnetic field intensity ($\vec{H}$) at OP will be as shown in Equation (7):

$$\vec{H} = \frac{1}{\mu}\vec{\nabla} \times \vec{A} \tag{6}$$

$$\vec{H} = \frac{\mu i \Delta l}{4\pi}\xi^2 \sin(\theta)\left[\frac{1}{j\xi r} - \frac{1}{(\xi r)^2}\right]e^{-j\xi r}a_\Phi \tag{7}$$

Referring to Equation (7), the radiated $\vec{H}$ will carry the signatures of the current. The total emitted $\vec{H}$ at OP is the summation of $\vec{H}$ created by each individual dipole. To evaluate the total emitted $\vec{H}$, a physics-based model of the motor can be built (e.g., in FEA software) considering all the geometrical details of the induction motor under consideration. Experimentally, $\vec{H}$ can be captured (e.g., by a loop antenna), amplified, and transmitted to the control board (e.g., dSpace1104), in which the Mat-Morph routine is implemented, as conceptualized in FIG. 3(a).

Figures 3A, 3B:
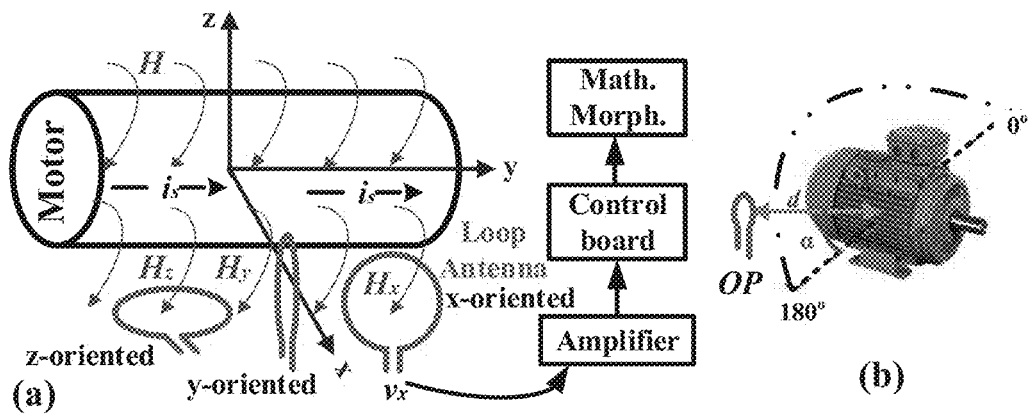
FIG. 3(a) shows a diagram of capturing magnetic field intensity ($\vec{H}$) for condition monitoring, according to an embodiment of the subject invention.
FIG. 3(b) shows a motor, with variables of the loop antenna positioning indicated (e.g., d, α).

In embodiments, the condition monitoring can be based on analyzing the radiated H in the T-domain. Therefore, placing and positioning a detector (e.g., a magnetic loop antenna) is a vital factor to consider. The magnetic flux lines radiated from the machine can cut the cross-sectional area of a loop antenna if the latter is placed oriented towards the x or z axes, as shown in FIG. 3(a). On the other hand, orienting the loop antenna towards the y axis fails to measure $\vec{H}$. Thus, the antenna can be oriented towards the x axis, as shown in FIG. 3(a), in order to capture the x component of the radiated field ($H_x$), and this is what was done in the experiments for the examples discussed below. The position of the antenna with respect to the induction motor can influence results, including the distance between the center of the antenna and the inductor motor body (d), and its rotation angle around the induction motor (α), referring to FIG. 3(b).

Mat-Morph is a technique used for the analysis of spatial structures, and it is based on set-theory, integral geometry, and lattice algebra. In contrast to the theory of linear signal processing, such as Fourier Transform (FT) and Wavelet Transform (WT), Mat-Morph is a non-linear signal processing technique that depends on the signal waveform in the T-domain rather than the F-domain. The main function of the Mat-Morph operator is to extract relevant structures of a set. The extraction is performed by the interaction between the signal and the Structuring Element (SE). The size of the SE is pre-defined according to the shape of the signal and the required features. In embodiments of the subject invention, the signal can be the radiated $\vec{H}$ from a DTC-driven induction motor, whose fundamental frequency is the power frequency ($f_{1M}$) (can be set by the DTC, in the range of tens of Hz), and the VSI switching frequency (e.g., $f_s$=10 kHz) can be superimposed. The high-order transients in the signal can be chosen as a fault indicator. Consequently, the SE can be chosen as a short time period. Typically, the SE should be $2^n$, where n is a positive integer. For example, the SE can be selected to be 16, which means SE length is $16T_s$, where $T_s$ is the sampling time of the signal.

The interaction between the main signal and the SE is done via a dilation operation, an erosion operation and a Mat-Morph Gradient (MMG), as follows (see also Serra et al., "Mathematical Morphology and its Application to Signal Processing", Int'l. Workshop on Mathematical Morphology and its Applications to Signal Processing (ISMM), 1993; which is hereby incorporated by reference in its entirety).

1. Dilation operation: Dilation can be abstracted as swelling or expanding of the shapes contained in the input signal by using an SE. Let k denote a signal and g denote the SE, and g is shorter than k. Dilation is defined as in Equation (8), $$\delta = (k \oplus g) = \max \{k(x+s) + g(s) | (x+s) \in D_k, s \in D_g\} \tag{8}$$

where ⊕ dilation operator means k dilated with g to produce the dilated signal δ. $D_k$, $D_g$ are the definition domain of k and g respectively, s is the length of the SE, and x is the samples of signal k in the short time buffer (refer to FIG. 1).

2. Erosion Operation: Erosion can be described as shrinking of the shapes contained in the input signal by using the SE. The same as dilation operation, erosion is described as the minimum interaction between the signal and the SE as formulated as in Equation (9), $$\varepsilon = (k \ominus g) = \min \{k(x+s) + g(s) | (x+s) \in D_k, s \in D_g\} \tag{9}$$

where ⊖ erosion operator means k eroded with g, and ε is the eroded signal (refer to FIG. 1).

3. MMG: The MMG, as defined in Equation (10), is the arithmetic difference between the dilation and erosion of a signal by the SE (refer to FIG. 1).

$$MMG = \delta - \varepsilon \tag{10}$$

In embodiments of the subject invention, Mat-Morph-based analysis of the radiated $\vec{H}$ from an asynchronous motor in a DTC-drive system can be used to detect TTF failures. The DTC system is a vector control drive system, which can be utilized in EV drive systems. The condition monitoring systems and techniques of embodiments of the subject invention can detect TTF incipient failures in the T-domain in a simple way (see examples for results obtained experimentally and in FEA co-simulation environment). Unlike the F-domain-based techniques that require monitoring of several harmonics/inter-harmonics to detect a fault, Mat-Morph condition monitoring is based on monitoring one value, the EEV. In addition, Mat-Morph routine in its basic concept is based on buffering, addition, and subtraction, which make it easy to implement on digital signal processing (DSP) boards, particularly compared to Fast Fourier Transform (FFT).

Embodiments of the subject invention provide several advantages over related art TTF diagnosis techniques in DTC-driven induction motors, which are based on analyzing the stator's current in either the F-domain (using FFT) or in the T-domain through its effect on the impedance of the induction motor. The related art methods are problematic and unreliable as they don't determine the TTF location in the motor, and the DTC and VSI by their nature exert numerous harmonics in the stator's current, which makes the TTF diagnosis in the F-domain more challenging because the switching activity might mimic the fault signatures.

Embodiments of the subject invention overcome these challenges, as discussed in detail herein.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

The FD techniques of embodiments of the subject invention were tested using FEA co-simulation and experimental environments. A comparative analysis between the accuracy of Mat-Morph based condition monitoring and F-domain based condition monitoring was also performed, as well as a test of the accuracy of the FD techniques through changing the location of a loop antenna.

The induction motor considered was a 1 horsepower (HP) WEG induction motor of M19 USS iron cored stator with 36 slots. The rotor had 44 slots, and aluminum bars of $3.8 \times 10^7$ $\sigma$/m. The induction motor had a thickness of 0.31 mm. Each phase had 6 coils connected in series, with total number of turns per phase being $N_{as}=510$. Four taps were done on the physical induction and the FEA model to study the TTF. The fault severity factor ($\mu_f$) is a ratio between the number of turns short-circuited and $N_{sa}$. The four faulty cases (C1, C2, C3, C4) are for $\mu_f=1.08\%$, 2.68%, 3.98%, and 4.7%, respectively. The fault resistance was $R_f=0.67\Omega$. The nameplate ratings and parameters of the induction motor are shown in Table II. The co-simulation environment was realized via the interactive coupling between the DTC-VSI models in Simulink/MatLab environment and the FEA model of an induction motor in MagNET/Infolytica.

TABLE II

NAMEPLATE RATINGS OF THE 1 HP WEG IM UNDER STUDY.

| Param. | Value | Param. | Value | Rating | Value | Rating | Value |
|---|---|---|---|---|---|---|---|
| $L_{ls}$ (mH) | 32.1 | $R_s$ ($\Omega$) | 9.292 | $P_r$ (W) | 746 | PF | 0.8 |
| $L_{lr}$ (mH) | 37.0 | $R_r$ ($\Omega$) | 7.231 | $V_r$ (V) | 460 | poles | 4 |
| $L_m$ (H) | 0.895 | $J_m$ (Kgm2) | 0.053 | $I_r$ (A) | 1.47 | $n_r$ (rpm) | 1730 |

Figures 4A, 4B, 4C, 4D, 4E, 4F:
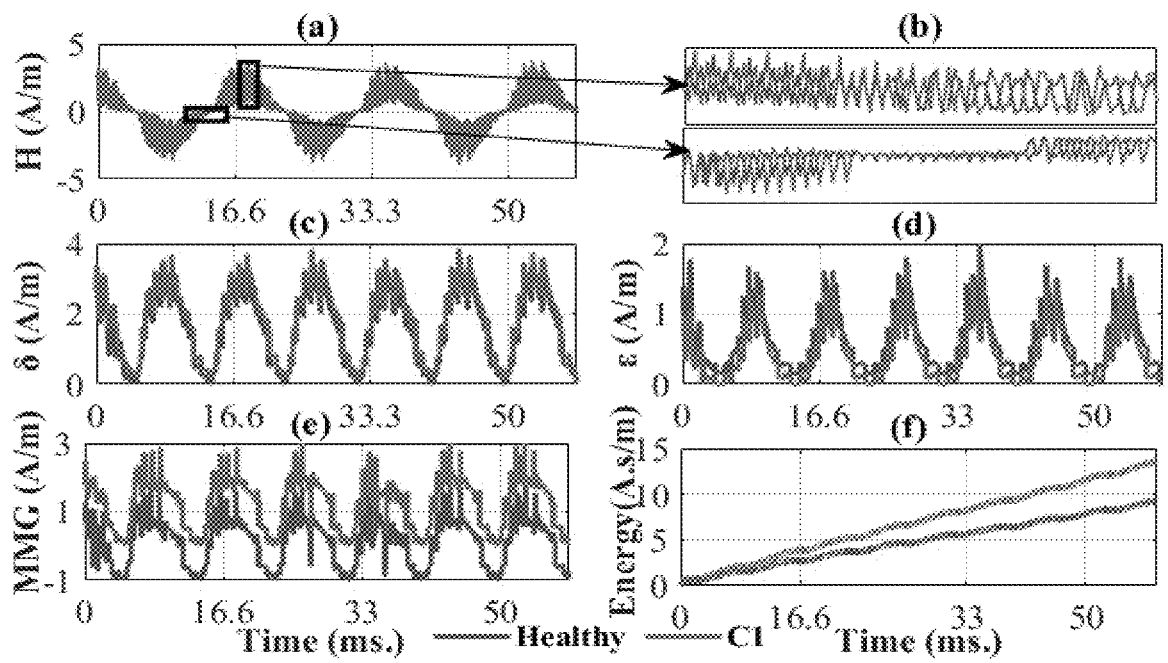
FIGS. 4(a)-4(f) show co-Simulation results for a healthy case and a faulty case (C1).

The emitted $\vec{H}$ at an observer point (OP) at 15 cm distance (d=15) was obtained for healthy and C1 faulty conditions from the FEA co-simulation environment, as shown in FIG. 4(a). Zooming of $\vec{H}$ of both cases around the zero-crossing and the peak are shown in FIG. 4(b), which shows that the faulty case has higher spikes than the healthy one. The dilation and erosion of the obtained signals are displayed in FIG. 4(c) and FIG. 4(d), respectively. According to Equation (6), the dilated signal is the maximum of the maximums of the absolute of H. As FIG. 4(c) shows, the maximums of the faulty cases are larger than those for the healthy case. In FIG. 4(d), the eroded signal (which is the minimum of the minimums as in Equation (7)) has a higher value in the healthy case if compared to the faulty.

Consequently, MMG, which is the difference between the dilation and erosion (as defined in Equation (8)), has a higher value in the faulty case if compared to the healthy, as depicted in FIG. 4(e). To discriminate the TTF fault, the area under the curves of FIG. 4(e) are calculated and denoted as 'Energy', which are shown in FIG. 4(f). The TTF fault detection is based on the end value of the energy at the processing window, as shown in the procedure in FIG. 1. The energy end value (EEV) was 9.185 amp-seconds per meter (A-s/m) and 13.5 A-s/m for the healthy and C1 cases, respectively.

The healthy condition and the four faulty conditions were run experimentally in the setup shown in FIG. 1. A 250 Watt (W), 42 Volt (V) DC PM generator, acting as a load, was coupled to the shaft of the 1 HP WEG asynchronous motor. The DTC control algorithm and the Mat-Morph condition monitoring routine were programmed on a dSpace 1104 board. A 36 turns of 7-41 Litz wire shielded by 10$\Omega$ resistance and 340 $\mu$H inductance loop antenna was used to capture the emitted $\vec{H}$ from the induction motor. The loop antenna was of frequency range 20 Hz to 500 kHz. To validate the industrial applicability of the condition monitoring in EV power-trains, all the experimental measurements were taken outside the Faraday's cage. The radiated $\vec{H}$ were recorded at different distances (d) and angles ($\alpha$) when all the drive system components are running except the motor. Those records were subtracted from the captured $\vec{H}$ when the entire drive system is running. Three case studies were investigated:

1. Investigating the effect of d on the fault detection accuracy

The experimental setup was operated under the five operational conditions (healthy and C1-C4) while the loop antenna captured the radiated $\vec{H}$ from the induction motor in each operational condition at 9 different distances (d changes from 15 to 55 cm with step of 5 cm, all at α=0°), which resulted in 45 experimental data points.

At each case, the captured $\vec{H}$ was subtracted from its corresponding value when the machine was not running, to counter-balance the effect of EM fields radiated by various components. The Mat-Morph routine was applied on the captured data, and the EEVs are displayed in FIG. 5(a). For better analysis on the condition monitoring technique, the EEV of the healthy cases were taken as a reference at each d, as shown in FIG. 5(b), and the EEVs were calculated as a percentage with respect to that reference value, according to Equation (9):

$$EEV\ (\%) = \left(\frac{EEV_{faulty} - EEV_{healthy}}{EEV_{healthy}}\right)\bigg|_{at\ same\ d} \times 100 \quad (9)$$

Figures 5A, 5B:
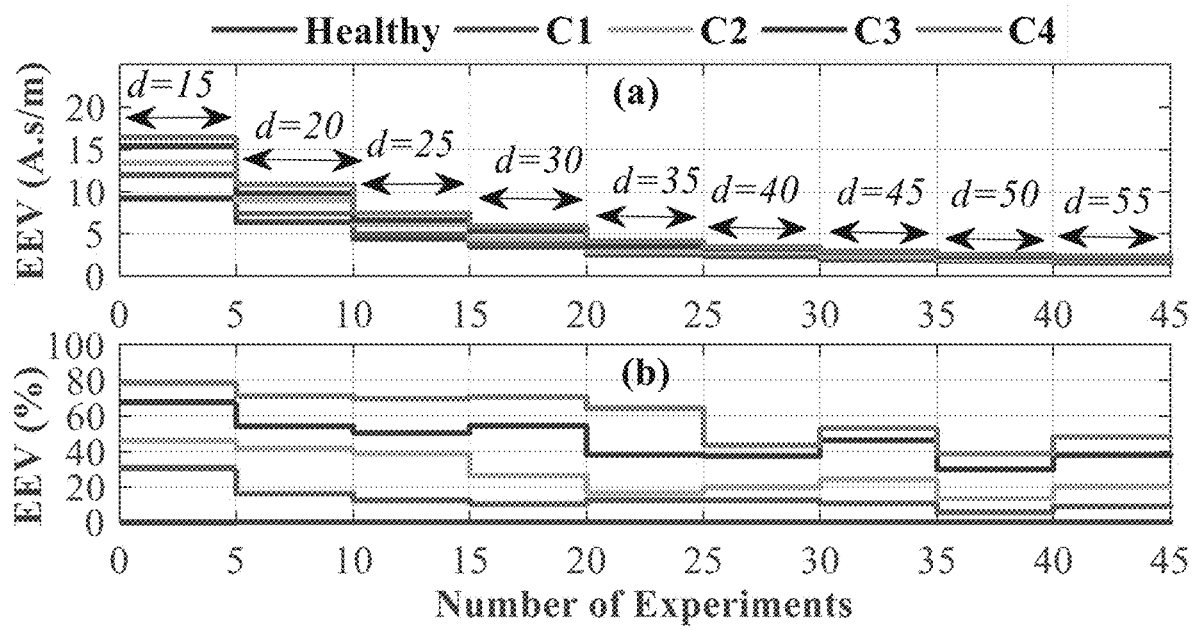
FIGS. 5(a)-5(b) show plots of the effect of changing d on the Mat-Morph-based turn-to-turn fault (TTF) detector.

The results in FIG. 5(b) shows that the Mat-Morph technique was able to detect incipient TTF with $\mu_f$=1.08% ($C_1$) with high accuracy for different values of d. The minimum EEV as a percentage was 5.6% for $C_1$ at d=50 cm, while it was 32% for d=15 cm. Further, the EEV was always in order with $\mu_f$. The EEV had a higher value in $C_4$ than $C_3$, higher in C3 than C2, and higher in C2 than C1, for any d.

2. Investigating the effect of the rotation angle (α) on the fault detection

Figures 6A, 6B:
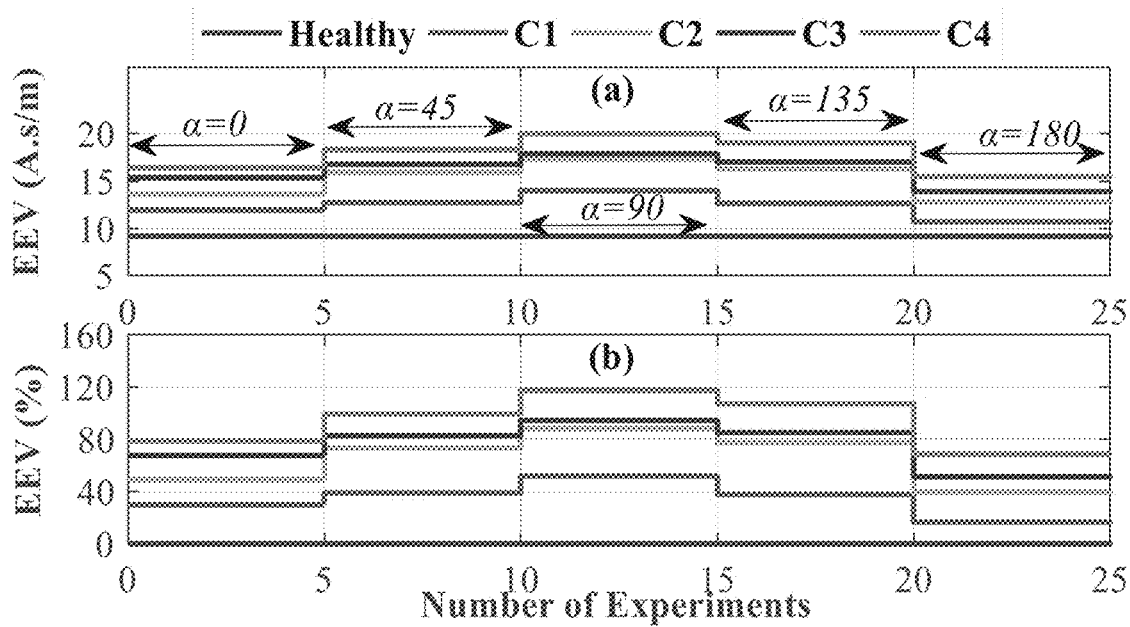
FIGS. 6(a)-6(b) show plots of the effect of changing a on the Mat-Morph-based TTF detector.

To investigate the effect of changing the angle between the loop antenna and the induction on the condition monitoring performance, 25 tests were conducted. For the five cases under study (healthy induction motor and C1-C4), d was kept constant (15 cm) while α kept changing from =0° to 180°, with step of 45°. The magnitude and percentage of the EEV for the 5 cases at each α are displayed in FIGS. 6(a) and 6(b), respectively. FIGS. 6(a) and 7(b) show that EEVs for the healthy case did not change with α, which indicates that the Mat-Morph-based condition monitoring is reliable way to detect TTFs, as the threshold value will not vary with α for a given d. Moreover, FIGS. 6(a) and 6(b) show that the EEVs of C1-C4 are the at α=90°, and higher for α=135° than α=45°, which indicates the existence of faulty turns between α=90° and 135°.

Figure 7:
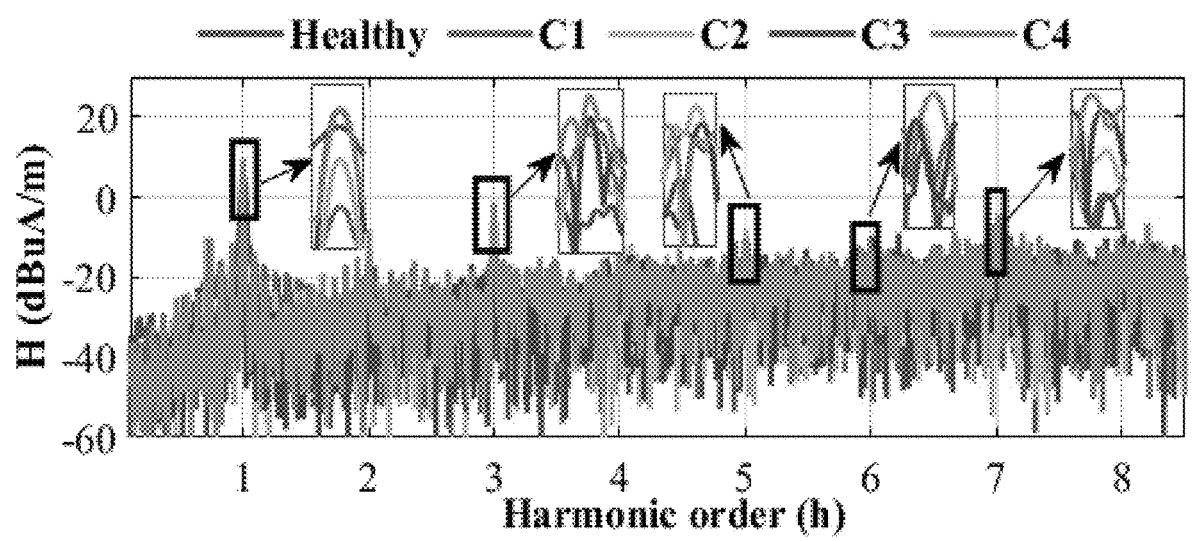
FIG. 7 shows a plot of experimental frequency response of $\vec{H}$ at power frequency range, at d=15 cm and α=0°.

Because detecting TTF for open loop driven motors using $\vec{H}$ has previously been based on monitoring its spectrum in the F-domain, the setup was run experimentally under the five conditions, and the loop antenna was placed d=15 cm and α=0°, and the captured $\vec{H}$ was analyzed via a real-time EM signal analyzer (RSA 5103A). The span of the spectrum analyzer was from 0 Hz to 510 Hz (harmonic order h=8.5) with 0.05 Hz resolution. FIG. 7 shows the obtained spectrum of $\vec{H}$ experimentally. Referring to FIG. 7, it can be seen that none of the harmonic orders classically used for condition monitoring (fundamental, $3^{rd}$, $5^{th}$, $6^{th}$, and $7^{th}$ orders) was able detect and discriminate the faults in order of $\mu_f$. For example, the healthy case has a higher fundamental component than C1 and C2, but lower than C4. Also, at the $3^{rd}$ order harmonic, all the faulty cases have a higher value than the healthy one, but the difference between the faulty ones is not significant. Moreover, at the $6^{th}$ and $7^{th}$ order harmonics, the healthy case coincided with C1, and it is hard to discriminate between them. That is, the analysis in the F-domain does not provide good results, especially compared to embodiments of the subject invention, which use the T-domain.

Results showed the capability of the condition monitoring techniques and systems of embodiments of the subject invention to detect TTF incipient failures in the T-domain in a simple way, experimentally and in an FEA co-simulation environment. Sensitivity analysis was conducted by changing the distance and the angle between the induction motor and the loop antenna in 70 experimental studies. Results revealed that the location of the faulty turns in the stator's winding could be detected through changing the angle of the magnetic antenna. Also, comparative analysis between the T-domain based Mat-Morph and the spectrum of $\vec{H}$ was presented. Results demonstrated that the condition monitoring techniques and systems of embodiments of the subject invention (using the T-domain) outperformed the spectrum (F-domain)-based techniques in detecting incipient TTFs.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for condition monitoring of turn-to-turn faults (TTFs) of an induction motor in a drive system, the method comprising:
   receiving, by a processor, a signal of the induction motor, the signal comprising information on a radiated magnetic field of the induction motor;
   performing, by the processor, a mathematical morphology (Mat-Morph) technique on the signal of the induction motor, based on the information on the radiated magnetic field of the induction motor, the Mat-Morph technique being performed in the time domain; and
   determining, by the processor, whether a TTF exists in the induction motor and, if so, a location of the TTF, based on results of the Mat-Morph technique.

2. The method according to claim 1, the induction motor being driven by direct torque control (DTC).

3. The method according to claim 1, the drive system being an electric vehicle drive system.

4. The method according to claim 1, the performing of the Mat-Morph technique comprising extracting relevant features of the signal based on interaction between the signal and a structuring element (SE) of the Mat-Morph technique.

5. The method according to claim 4, the SE being $2^n$, where n is a positive integer.

6. The method according to claim 5, a length of the SE being $2^n$ times $T_s$, where $T_s$ is a sampling time of the signal.

7. The method according to claim 5, n being 4 such that the SE is 16.

8. The method according to claim 4, the performing of the Mat-Morph technique comprising performing a dilation operation to produce a dilated signal, an erosion operation to produce an eroded signal, and a Mat-Morph Gradient (MMG) operation, the MMG operation comprising subtracting the erosion signal from the dilation signal.

9. The method according to claim 8, the dilation operation comprising the following $$\delta = (k \oplus g) = \max\ \{k(x+s) + g(s) | (x+s) \in D_k, s \in D_g\},$$

where k represents the signal, g represents the SE, δ represents the dilated signal, ⊕ represents k dilated with g to produce the dilated signal, $D_k$ is a definition domain of k, $D_g$ is a definition domain of g, x is a sample of k, and s is a length of the SE, and the erosion operation comprising the following $$\varepsilon = (k \ominus g) = \min\{k(x+s)+g(s)|(x+s) \in D_k, s \in D_g\},$$

where ε represents the eroded signal and ⊖ represents k eroded with g to produce the eroded signal.

10. The method according to claim 1, the performing of the Mat-Morph technique comprising performing a dilation operation to produce a dilated signal, an erosion operation to produce an eroded signal, and a Mat-Morph Gradient (MMG) operation, the MMG operation comprising subtracting the erosion signal from the dilation signal.

11. The method according to claim 1, the determining of whether a TTF exists in the induction motor comprising monitoring an energy end value of the induction motor after performing the Mat-Morph technique.

12. A system for condition monitoring of turn-to-turn faults (TTFs) of an induction motor in a drive system, the system comprising:
   a sensor configured to detect magnetic radiation;
   a processor; and
   a non-transitory machine-readable medium in operable communication with the processor and the sensor, and comprising instructions stored thereon that when executed cause the processor to:
      receive a signal of the induction motor, the signal comprising information on a radiated magnetic field of the induction motor;
      perform, a mathematical morphology (Mat-Morph) technique on the signal of the induction motor, based on the information on the radiated magnetic field of the induction motor, the Mat-Morph technique being performed in the time domain; and
      determine whether a TTF exists in the induction motor and, if so, a location of the TTF, based on results of the Mat-Morph technique.

13. The system according to claim 12, the sensor being a loop antenna.

14. The system according to claim 12, the induction motor being driven by direct torque control (DTC), and
   the drive system being an electric vehicle drive system.

15. The system according to claim 12, the performing of the Mat-Morph technique comprising extracting relevant features of the signal based on interaction between the signal and a structuring element (SE) of the Mat-Morph technique.

16. The system according to claim 15, the SE being $2^n$, where n is a positive integer, and
   a length of the SE being $2^n$ times $T_s$, where $T_s$ is a sampling time of the signal.

17. The system according to claim 15, the performing of the Mat-Morph technique comprising performing a dilation operation to produce a dilated signal, an erosion operation to produce an eroded signal, and a Mat-Morph Gradient (MMG) operation, the MMG operation comprising subtracting the erosion signal from the dilation signal.

18. The system according to claim 17, the dilation operation comprising the following $$\delta = (k \oplus g) = \max\{k(x+s)+g(s)|(x+s) \in D_k, s \in D_g\},$$

where k represents the signal, g represents the SE, δ represents the dilated signal, ⊕ represents k dilated with g to produce the dilated signal, $D_k$ is a definition domain of k, $D_g$ is a definition domain of g, x is a sample of k, and s is a length of the SE, and the erosion operation comprising the following $$\varepsilon = (k \ominus g) = \min\{k(x+s)+g(s)|(x+s) \in D_k, s \in D_g\},$$

where ε represents the eroded signal and ⊕ represents k eroded with g to produce the eroded signal.

19. The system according to claim 12, the determining of whether a TTF exists in the induction motor comprising monitoring an energy end value of the induction motor after performing the Mat-Morph technique.

20. A method for condition monitoring of turn-to-turn faults (TTFs) of an induction motor in a drive system, the method comprising:
   receiving, by a processor, a signal of the induction motor, the signal comprising information on a radiated magnetic field of the induction motor;
   performing, by the processor, a mathematical morphology (Mat-Morph) technique on the signal of the induction motor, based on the information on the radiated magnetic field of the induction motor, the Mat-Morph technique being performed in the time domain; and
   determining whether a TTF exists in the induction motor and, if so, a location of the TTF, based on results of the Mat-Morph technique,
   the induction motor being driving by direct torque control (DTC),
   the drive system being an electric vehicle drive system,
   the performing of the Mat-Morph technique comprising extracting relevant features of the signal based on interaction between the signal and a structuring element (SE) of the Mat-Morph technique,
   the SE being $2^n$, where n is a positive integer,
   a length of the SE being $2^n$ times $T_s$, where $T_s$ is a sampling time of the signal,
   n being 4 such that the SE is 16,
   the performing of the Mat-Morph technique comprising performing a dilation operation to produce a dilated signal, an erosion operation to produce an eroded signal, and a Mat-Morph Gradient (MMG) operation, the MMG operation comprising subtracting the erosion signal from the dilation signal,
   the dilation operation comprising the following $$\delta = (k \oplus g) = \max\{k(x+s)+g(s)|(x+s) \in D_k, s \in D_g\},$$

where k represents the signal, g represents the SE, δ represents the dilated signal, ⊕ represents k dilated with g to produce the dilated signal, $D_k$ is a definition domain of k, $D_g$ is a definition domain of g, x is a sample of k, and s is a length of the SE, the erosion operation comprising the following $$\varepsilon = (k \ominus g) = \min\{k(x+s)+g(s)|(x+s) \in D_k, s \in D_g\},$$

where ε represents the eroded signal and ⊖ represents k eroded with g to produce the eroded signal, and the determining of whether a TTF exists in the induction motor comprising monitoring an energy end value of the induction motor after performing the Mat-Morph technique.

* * * * *